(12) United States Patent
Delson

(10) Patent No.: US 7,503,410 B2
(45) Date of Patent: Mar. 17, 2009

(54) DYNAMIC LEGGED ROBOT

(75) Inventor: Nathan J. Delson, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/668,381

(22) Filed: Jan. 29, 2007

(65) Prior Publication Data

US 2007/0150110 A1 Jun. 28, 2007

Related U.S. Application Data

(62) Division of application No. 11/068,243, filed on Feb. 26, 2005, now Pat. No. 7,168,513.

(60) Provisional application No. 60/548,362, filed on Feb. 27, 2004.

(51) Int. Cl.
*B62D 57/00* (2006.01)

(52) U.S. Cl. .......................... 180/7.1; 180/8.1; 901/1

(58) Field of Classification Search .......... 180/8.1, 180/8.5, 8.6, 7.1; 901/1
See application file for complete search history.

(56) References Cited

U.S. PATENT DOCUMENTS

| | | | |
|---|---|---|---|
| 4,721,030 A | 1/1988 | Paynter | |
| 4,733,603 A | 3/1988 | Kukolj | |
| 5,040,626 A | 8/1991 | Paynter | |
| 5,077,510 A * | 12/1991 | Collie | 318/568.12 |
| 5,094,311 A * | 3/1992 | Akeel | 180/119 |
| 5,161,631 A * | 11/1992 | Urakami | 180/164 |
| 5,351,773 A * | 10/1994 | Yanagisawa | 180/8.5 |
| 5,575,346 A * | 11/1996 | Yberle | 180/8.6 |
| 5,995,506 A | 11/1999 | Fujimori | |
| 6,247,546 B1 | 6/2001 | Spletzer et al. | |
| 6,253,122 B1 | 6/2001 | Razavi et al. | |
| 6,253,367 B1 | 6/2001 | Tran et al. | |
| 6,263,498 B1 | 7/2001 | Alcorn et al. | |
| 6,330,711 B1 | 12/2001 | Knutson | |
| 6,349,746 B1 | 2/2002 | Bergemann et al. | |
| 6,430,570 B1 | 8/2002 | Judge et al. | |
| 6,442,748 B1 | 8/2002 | Bowman-Amuah | |
| 6,473,759 B1 | 10/2002 | Herrendoerfer et al. | |
| 6,527,071 B1 | 3/2003 | Villedieu | |
| 6,594,700 B1 | 7/2003 | Graham et al. | |
| 6,609,158 B1 | 8/2003 | Nevarez et al. | |

(Continued)

OTHER PUBLICATIONS

Kaneko, K. et al., "Human robot HRP-2," Proceedings of the 2004 IEEE International Conference on Robotics & Automation, New Orleans, LA. Apr. 2004, pp. 1083-1090.

(Continued)

*Primary Examiner*—Kevin Hurley
(74) *Attorney, Agent, or Firm*—Fish & Richardson P.C.

(57) ABSTRACT

A legged robot having a robot structure (20) in the form of a closed kinematic chain and an actuator (26) that contracts when activated. The contraction of the actuator extends a foot element (30) such that it can excerpt a pushing force against a ground surface. When the foot element excerpts sufficient force the legged robot can separate from the ground surface and achieve a dynamic hopping motion.

20 Claims, 6 Drawing Sheets

U.S. PATENT DOCUMENTS

| | | |
|---|---|---|
| 6,654,801 B2 | 11/2003 | Mann et al. |
| 6,675,159 B1 | 1/2004 | Lin et al. |
| 6,840,152 B2 | 1/2005 | Kriwet et al. |
| 2002/0092000 A1 | 7/2002 | Srinivasan et al. |
| 2004/0089090 A1 | 5/2004 | Maeda |
| 2005/0028237 A1 | 2/2005 | Greenhill et al. |
| 2006/0090938 A1 | 5/2006 | Tanielian |

OTHER PUBLICATIONS

Brown, et al., The bow leg hopping robot, *Proceedings of the IEEE International Conference on Robotics and Automation*, Leuven, Belgium, May 1998.

Paul, et al., "Control of Lateral Bounding for a Pendulum Driven Hopping Robot", Proceedings of the International Conference of Climbing and Walking Robots, Paris, France, 2002.

\* cited by examiner

DYNAMIC LEGGED ROBOT

CROSS-REFERENCE TO RELATED APPLICATIONS

This application claims the benefit of and is a divisional application of U.S. patent application Ser. No. 11/068,243 filed on Feb. 26, 2005 now U.S. Pat. No. 7,168,513, which claims the benefit of and U.S. Provisional Patent Application No. 60/548,362 filed Feb. 27, 2004. The entire disclosure of the U.S. application Ser. No. 11/068,243 is incorporated by reference as part of the specification of this application.

BACKGROUND

This invention relates to mobile robots, specifically to legged robots.

DESCRIPTION OF PRIOR ART

The goal of developing a walking machine has been pursued since the late 1800s. One objective has been mobility, since the large majority of land is not reachable by wheeled and tracked vehicles. Other objectives include a greater understanding of biological systems and the design of human prostheses. And finally entertainment has always been a component of walking machine design.

Since the 1960s a number of successful walking machines have been built. A majority of these machines have four or more legs, and move in a quasi-static fashion meaning that at least three legs are kept on the ground at one time with the center of gravity of the robot kept within the region defined by the grounded feet. These robots move relatively slowly, and a large amount of computation is required to for leg placement over uneven terrain.

Marc Raibert, in Legged Robots That Balance, MIT Press (1986), describes dynamic legged robots that move in a fashion similar to fast moving biological animals where all legs can be in the air at the same time. Such dynamic robots have reached relatively high speeds of 21 km/h. However, one of the limiting factors of these robots, is that they must be plugged into the wall with a tether to a power source. These robots use electric motors, pneumatic actuators, and hydraulic actuators. The heavy weight of these actuators and power supply of such systems (e.g. batteries and hydraulic pumps) prevent dynamic hopping and running if they are carried on the robot. A robot that must be tethered to a power supply is significantly limited in its range of mobility.

Other legged robots have been developed that carry their own power supply and thus have increased mobility. The Honda Humanoid Robot (Kenji Kaneko et al. International Conference on Robotics & Automation, New Orleans, La., April 2004 pp. 1083-1090) carries its own batteries, but it does not exhibit highly dynamic motion, such as running or hopping where all legs are in the air simultaneously. The speed of the Honda Humanoid Robot is a relatively slow speed of approximately 2.5 km/h. Other robots, such as described by Paynter in U.S. Pat. No. 5,040,626 (1991), move in a quasi-static fashion and have gaits where multiple legs are in contact with the ground at all times; thereby limiting the speed of the robot.

Many legged robots have gaits where legs move back and forth during each stride. Therefore, these gaits require continual reversal of angular momentum of each leg, which reduces the top speed of the robot.

Accordingly, there is a need for a legged robot that can carry its own power supply and move at high speed with a dynamic gait. To achieve this objective there is a need for efficiency in the overall design of a robot. Specifically, there is a need that the robot actuators, power supply, structure, and control method all be designed for efficient high speed motion.

The present invention comprises a legged robot that can achieve high-speed dynamic motion, while carrying its own power supply, so that it can be un-tethered.

OBJECTS AND ADVANTAGES

In addition to the object and advantages of the present invention described above, several objects and advantages of the present invention are:

a) Use of lightweight contractile actuators to reduce weight of a legged robot, and thereby reduce energy losses during impact with ground;

b) Use of compressed gas as a high power and light weight energy source, which enables dynamic motion;

c) A robot structure that has reduced structural loads, and thus can be light weight;

d) A robot structure with energy efficient joints;

e) A high speed legged gait;

f) Connections between actuator and robot structure that allow energy recovery during each gait cycle.

Further object and advantages will become apparent from a consideration of the ensuing description and drawings.

BRIEF DESCRIPTION OF THE DRAWINGS

These and other features, aspects, and advantages of the present invention will become better understood with regard to the following description, appended claims and accompanying drawings, where:

REFERENCE NUMERALS IN DRAWINGS

Figure 1:
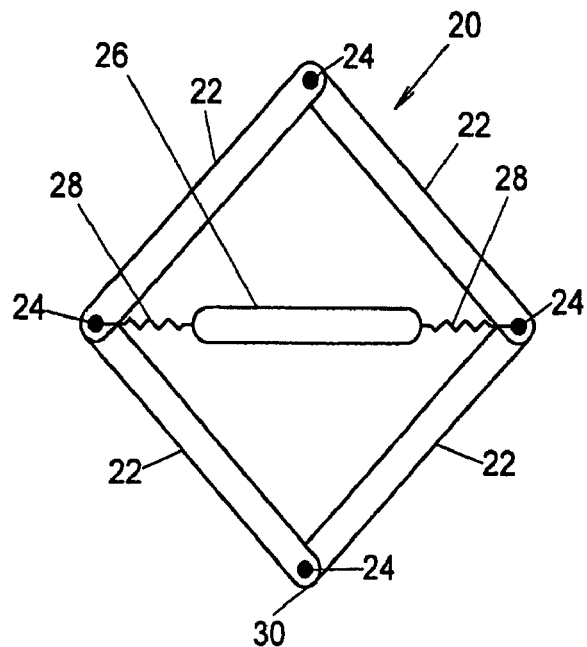
FIG. 1 shows a preferred embodiment of a robot structure.

20 robot structure 22 link 24 pivot 26 actuator 28 spring 30 foot element 32 ground 34 opposing spring 36 opposing foot element 38 platform link 40 gear teeth 42 connecting link 46 robot 100 contractile pneumatic 102 sheath actuator 104 bladder 106 end cap 108 hose connection 110 clamp 120 horizontal actuator 122 horizontal spring 124 vertical actuator 126 vertical spring 200 sensors 202 controller 204 actuators 206 stabilizing mass 208 stabilizing actuator 210 pressure vessel 212 valve 240 flexure pivot

DETAILED DESCRIPTION

A robot is a machine that includes the following components: structure, actuator, power source, sensor, and controller. A mobile robot is a robot that can travel from one location to another. The machines described herein are a class of mobile robots that use legs for locomotion. The following sections describe the various robot components that comprise the invention of a dynamic legged robot.

FIGS. 1 and 2A-2C—Embodiment of Robot Structure

A preferred embodiment of the robot structure 20 of the present invention is shown in FIG. 1. A robot structure is the primary mechanical structure that provides support for a robot's actuators, sensors, power sources, appendages, and other components. The robot structure 20 is a Closed Kinematic Chain, consisting of links 22 and pivots 24. In this embodiment there are four links 22 connected by four pivots 24. An actuator 26 is connected through springs 28 to the robot structure 20. The actuator 26 contracts when activated and thereby changes the shape of the robot structure. A foot element 30 is attached to a link 22.

Figures 2A, 2B, 2C:
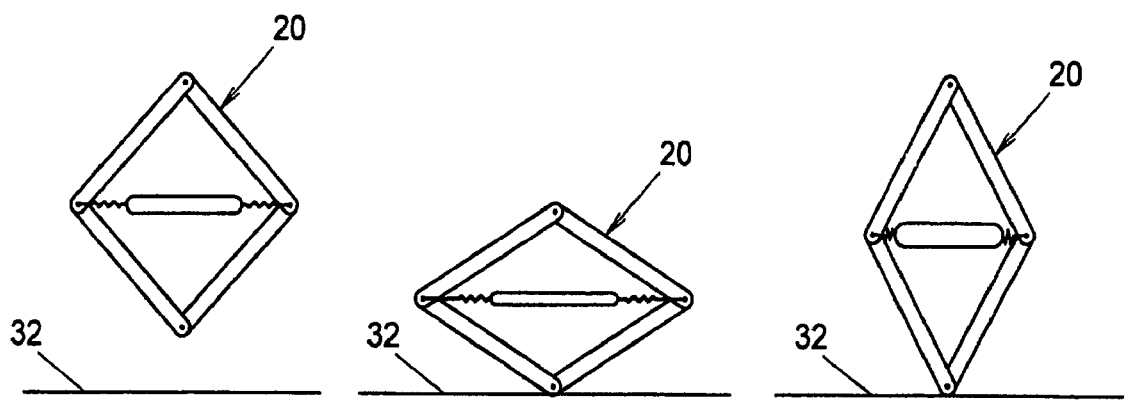
FIGS. 2A to 2C show stages of robot hopping motion.

The steps in a dynamic hop of the robot is shown in FIG. 2A-2C. The first step is shown in FIG. 2A where the robot is falling towards the ground 32. The motion of the robots described herein are described relative to ground, but such robot motion can be applied relative to any fixed object. The second step is shown in FIG. 2B where the foot element 30 impacts the ground 32, typically extending the actuator 26 and springs 28. The third step is shown in FIG. 2C, where the actuator 26 is actuated, and the contraction of the actuator pushes the robot upwards in a hop. The upwards hop of the robot is also assisted by the force in the springs 28. As the actuator 26 is contracted the links 22 rotate about the pivots 24 causing the shape of the robot structure 20 to change and thus converting actuator 26 motion into robot structure motion.

The foot element 30 is a part of the robot structure 20 that is designed to contact the ground and withstand impacts with the ground. The foot element 30 may be made of a material with a high coefficient of restitution to minimize energy loss during impact. Alternatively the foot element 30 may made of similar material and have a similar shape to other portions of the robot structure 20.

When the robot structure 20 is in a gravitational field and in contact with the ground 32, as shown in FIGS. 2B and 2C, contraction of actuator 26 extends foot element 30 such that it exerts a force against the ground. The actuator 26 can be sized such that its speed of contraction, power output, and force output are such that the force between the foot element and the ground is greater than the weight of the robot. Accordingly, the force between the foot element and the ground can cause the robot structure to loose contact with the ground and hop.

A Closed Kinematic Chain is defined as a sequence of hinged bodies forming a loop. In the description herein, the hinges of a Closed Kinematic Chain refer to internal hinges of a structure. Thus, the statement that the robot structure is a Closed Kinematic Chain means that the internal components of the robot structure, including its links and pivots, form a Closed Kinematic Chain. Accordingly, the robot structure 20 shown in FIG. 1 is a Closed Kinematic Chain regardless of whether it is in contact with the ground or other surface. If the robot contacts the ground and an additional pivot point is created between the robot and the ground at the contact point, this additional pivot is referred to as a Contact Pivot, and is distinct from the internal pivots of the robot.

An advantage of the robot structure shown in FIG. 1, is that each robot link 22 absorbs compressive or tensile loading, with minimal or no bending loads. Since bending loads often create the highest stress in machine components, it is possible to build relatively lightweight structures in a mechanism with links that have only bending or compression. Reducing the weight of the robot can increase its speed and dynamic performance.

An additional advantage of the robot described above is that the energy can be recovered during each hop; thereby increasing the energy efficiency of the robot. When the robot falls to the ground 32 the kinetic energy of the robot is transferred into potential energy of the springs 28 and the actuator 26. Thus the kinetic energy of the robot before it hits the floor, stretches the springs 28 and the actuator 26 during the impact with the ground 32. During the stage of bouncing upwards the energy stored in the springs 28 is transferred to the robot structure, thereby assisting the actuator 26 in propelling the robot upwards. The spring constants and inertia of the robot can be selected so that the natural frequency of the robot structure 20 is optimized for maximum energy recovery during each hop.

Figure 3:
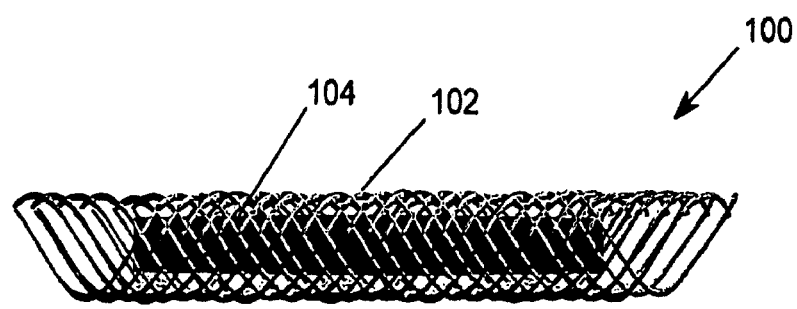
FIG. 3 shows primary components of a contractile pneumatic actuator.
Figure 4A:
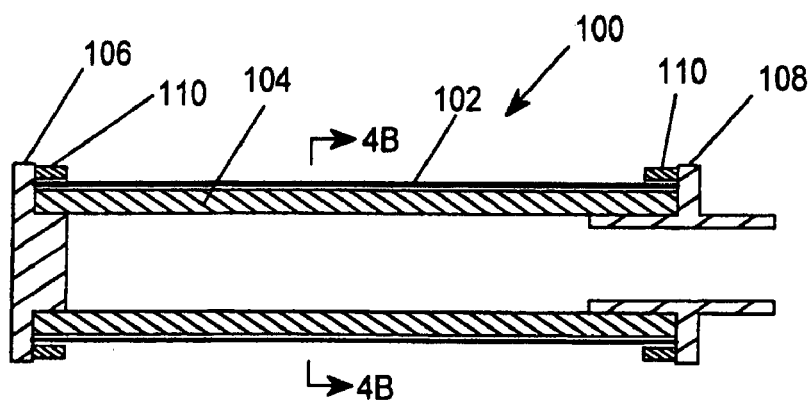
FIGS. 4A and 4B show cross section views of a contractile pneumatic actuator.
Figure 4B:
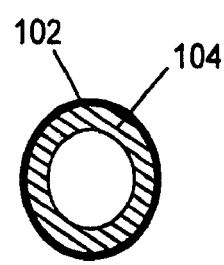

FIGS. 3, 4A, and 4B—Contractile Pneumatic Actuator

A preferred embodiment of the robot uses a contractile actuator to provide energy for locomotion and for hopping. An actuator transfers energy from an energy storage unit into the robot structure. A contractile actuator contracts in length when activated. A preferred type of contractile actuator for the robot is a Contractile Pneumatic Actuator as shown in FIGS. 3, 4A and 4B. FIG. 3 shows primary components of a Contractile Pneumatic Actuator 100, which are a sheath 102 and a bladder 104. The bladder 104 is an airtight membrane, and is shown in a tubular shape. The bladder 104 can be made of latex or other flexible material. The sheath 102 constrains the motion of the bladder 104. In the embodiment shown in FIGS. 3 and 4 the sheath 102 is composed of weaved threads, which surround the bladder 104. The threads of the sheath 102 may be made of nylon. Alternative embodiments include a sheath that is integrated into the bladder material.

FIGS. 4A and 4B shows additional details of a Contractile Pneumatic Actuator 100. FIG. 4A shows a cross section side view. An end cap 106 plugs the end of one side of the actuator. A hose connector 108 is located at the other end of the actuator, and allows a hose to be connected the actuator. Clamps 110 are located at both ends of the actuator and clamp the end cap 106 and hose connection 108 to the sheath 102 and bladder 104. A cross section end view is defined by line 4B-4B in FIG. 4A, and this cross section is shown in FIG. 4B. In the embodiment shown in FIG. 4B, the sheath 102 and bladder 104 have a tubular shape. An alternative embodiment has hose connectors 108 at both ends of the actuator.

A Contractile Pneumatic Actuator is activated by flow of fluid into its bladder, where the fluid may be a gas or liquid. When fluid flows into the bladder, the internal volume of the bladder increases. The sheath of the Contractile Pneumatic Actuator constrains the motion of the bladder, causing the bladder to contract in length as its internal volume increases. In this fashion, the Contractile Pneumatic Actuator contracts in length when it is activated.

In embodiments where the Contractile Pneumatic Actuator has hose connectors 108 at both ends of the bladder 104, allow fluid to enter both ends of the actuator simultaneously. Alternatively, fluid may enter one end of the actuator and exit the other end.

Examples of Contractile Pneumatic Actuator include those described by: U.S. Pat. No. 6,349,746 to Bergemann et al. (2002); U.S. patent application Ser. No. 20,050,028,237 to Greenhill et al. (2005); U.S. Pat. No. 6,840,152 to Kriwet et al. (2005); U.S. Pat. No. 4,733,603 to Kukolj (1988); and U.S. Pat. No. 4,721,030 to Paynter (1988).

An advantage of Contractile Pneumatic Actuator is that as a contractile actuator, the components of the actuator are primarily in tension, and thus are not susceptible to bucking, which may occur if large compressive loads were present. Since buckling of the actuator is not likely, a contractile actuator can be made of components with relatively thin cross sections and thus be lightweight. An additional advantage of Contractile Pneumatic Actuator is that the use of pneumatic power allows for high power output with low weight energy storage.

Figure 5:
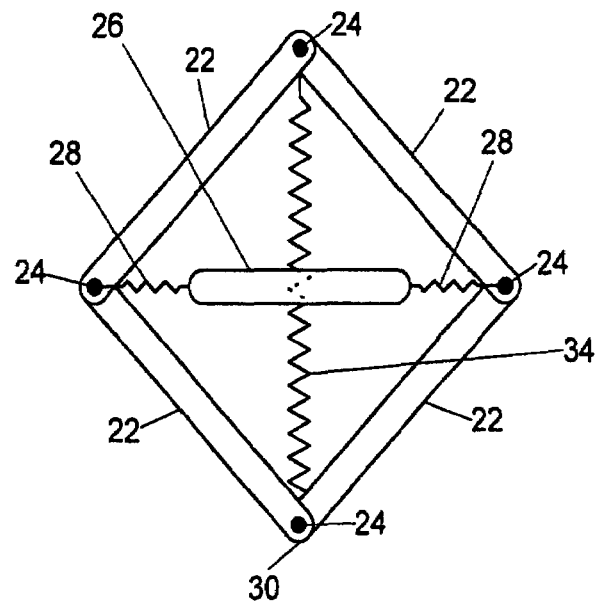
FIG. 5 shows a robot structure configuration with an alternative spring embodiment.

FIG. 5—Alternative Spring Embodiment

An alternative embodiment shown in FIG. 5 includes an opposing spring 34 configured vertically, in addition to the horizontally configured actuator 26 and springs 28. The opposing spring 34 provides a counter-force to the actuator 26. The motion of actuator 26 contracting, stretches the opposing spring 34. A compressive force in opposing spring 34 creates a tensile force in actuator 26. When the actuator 26 is a Contractile Pneumatic Actuator 100, then the opposing spring 34 lengthens the actuator when gas is released from the pneumatic actuator 100. By the lengthening the pneumatic actuator 100, the opposing spring helps prepare the pneumatic actuator 100 for the next activation, since a Contractile Pneumatic Actuator 100 often performs better then lengthened before activation.

The spring 28 connected in series with the actuator 26 can be comprised of a single spring element or multiple spring elements. The spring 28 can be a separate component or can be integrated into the actuator 26. Thus an actuator that extends when a tensile force is applied to it and stores energy in its internal structure due to work done by such a tensile force, functions as a spring as well as an actuator. Thus actuator 26 itself can serve as a spring, and be used to capture and release energy during each hopping step, An alternative embodiment is to include torsion springs at all or some of the robot pivots 24. These torsion springs would increase the energy storage capability of the springs of the robot. In some embodiments, the torsion springs could replace all or some of the springs placed in series with the contractile actuator. The torsion springs could also replace all or some of the springs placed in opposition to the contractile actuator.

Figure 6:
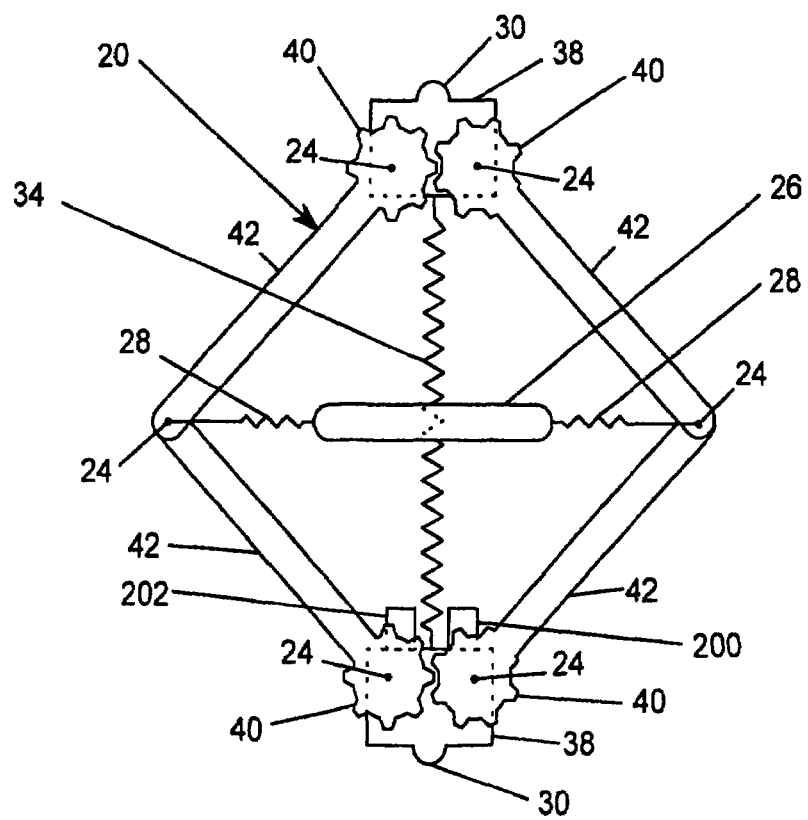
FIG. 6 shows a robot structure embodiment with a platform link.

FIG. 6—Embodiment with Platform Link

FIG. 6 shows an alternative embodiment of the robot structure 20. In this embodiment the robot structure 20 is a Closed Kinematic Chain that is comprised of four connecting links 42 and two platform links 38 connected together with six joints 24. The connecting links 42 have gear teeth 40 attached to them at the end where they are pivoted with the platform links 38. The meshing between adjacent gear teeth 40 ensures the angle of rotation of the right connecting links 42 relative to a platform link 38 is equal to the angle of rotation of the left connecting links 42 relative to the same platform link 38. This meshing between adjacent gear teeth 40 creates a Linkage Constraint that reduces the degrees of freedom of the robot structure 20 to a single degree of freedom.

The orientation of a robot or robot component can be defined relative to the locations of specified points on the robot or robot component. One method to specify the orientation of the robot structure 20 is relative to the location of the pivots 24 of the structure. When the location of pivots on a robot are symmetrical, then the orientation of the robot can be defined relative to an axis of symmetry of the pivots. In the embodiment shown in FIG. 6, the orientation of the robot structure 20 is defined by an axis of symmetry of the location of the pivots 24 of the robot structure 20 that is along the vertical axis aligned with the opposing spring 34. In the embodiment shown in FIG. 6, the orientation of both platform links 38 remains approximately fixed relative to each other, and also approximately fixed relative to the orientation of the robot structure. Therefore, in the embodiment shown in FIG. 6, the angular velocity of the platform links 38 are approximately equal to the angular velocity of the robot structure.

An advantage of the embodiment shown in FIG. 6 is that there is no change in the orientation of the platform links 38 relative to the orientation of the robot structure, even when the actuator 26 is activated. Thus the platforms 38 provide a surface that can be used to define the orientation of the robot structure 20. In addition, components whose function is simplified when aligned to the robot structure's orientation can be mounted on a platform link 38. As shown in FIG. 6, sensors 200 and a controller 202 are mounted to the upper platform link 38. Mounting sensors and a controller to a platform whose orientation is fixed relative to the robot's orientation simplifies sensor measurement interpretation, as well as connections to the controller. Sensors can include an accelerometer that can measure impact with the ground and be used by the controller to determine when to activate the contractile actuator 26 in order to hop. Other accelerometers can be used to sense the orientation of the robot structure. A rate gyroscope sensor can also be used to sense the angular velocity of the robot structure 20.

In the embodiment shown in FIG. 6, two discrete foot elements 30 are mounted to the robot structure 20; one on the top and the other on the bottom of the robot structure. These two foot elements enable the robot structure 20 to hop on the ground in two orientations. In this embodiment when one foot element is in contact with a relatively flat ground surface, then the other foot element cannot contact the same ground surface. Therefore, the contact between foot elements and the ground occurs sequentially rather than simultaneously.

Figure 7:
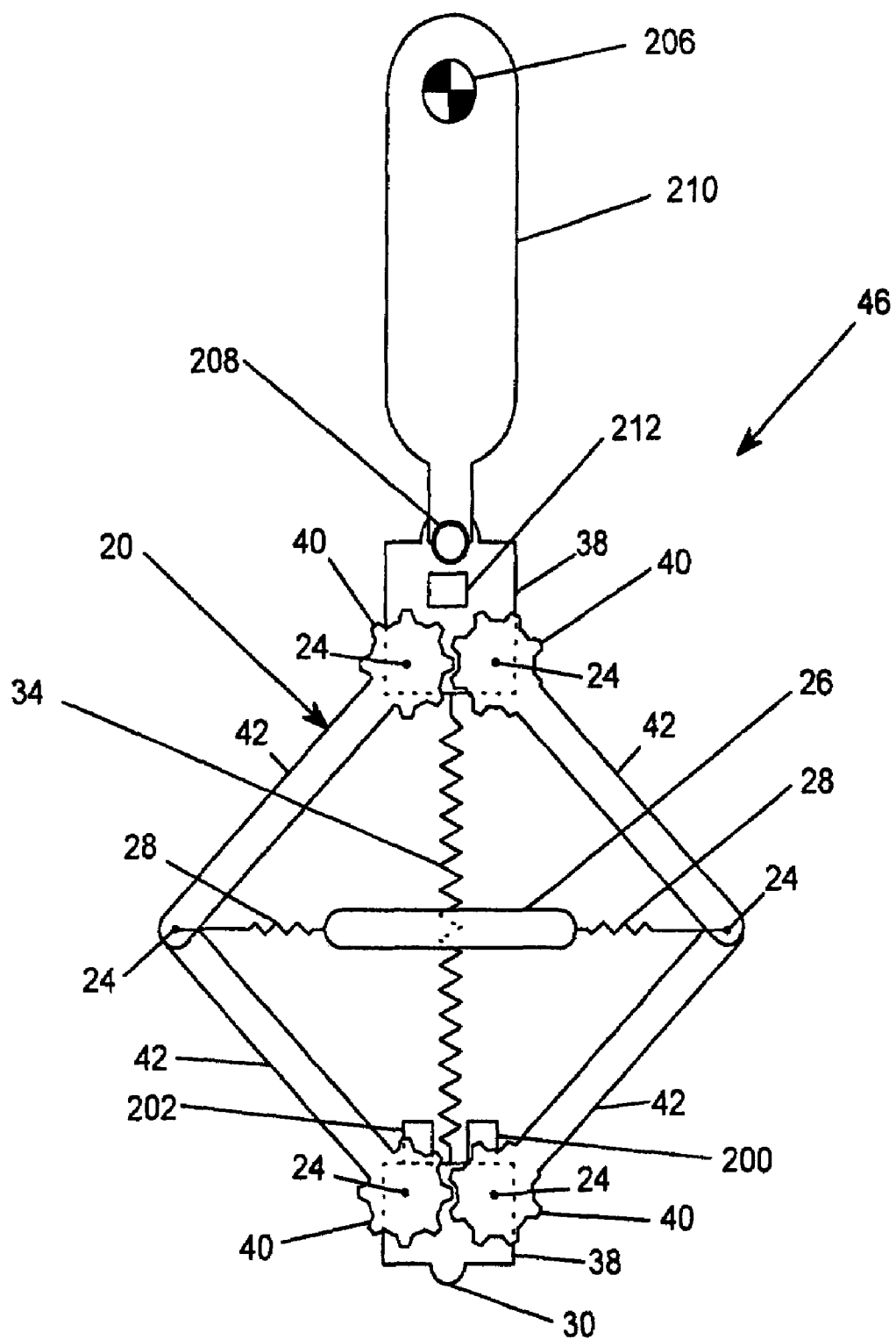
FIG. 7 shows a robot embodiment including a stabilizing mass.

Alternative embodiments include additional foot elements. Foot elements can be attached to any of the links of the robot structure. Foot elements can be attached to links whose orientation remains constant relative to the orientation of the robot structure, or foot elements can be attached to link whose orientation does not remains constant relative to the orientation of the robot structure FIGS. 7 and 10—Robot Embodiment Including Stabilizing Mass, and a Control Block Diagram An embodiment of a legged robot system is shown in FIG. 7. The robot 46 includes a robot structure 20, and actuator 26 that contacts when actuated. In addition, a stabilizing actuator 208 is attached to the robot structure 20 and a stabilizing mass 206 is attached to a stabilizing actuator 208. In addition, sensors 200, a controller 202, and a valve 212 are attached to the robot structure. In the embodiment in FIG. 7A-7B, the stabilizing mass 206 includes a pressure vessel 210.

Stabilization and Orientation Control

For a single legged hopping robot, dynamic stabilization is required. One method for implementing such stabilization is to have a mass on the robot that is moved to provide reaction forces and torques on the robot and thereby generate the desired motion of the robot. In this fashion the robot can be stabilized to hop vertically or hop in a specific direction. The robot 46, can be controlled such that the point on the foot element which contacts the ground is substantially the same at different incidences of contact.

Figure 10:
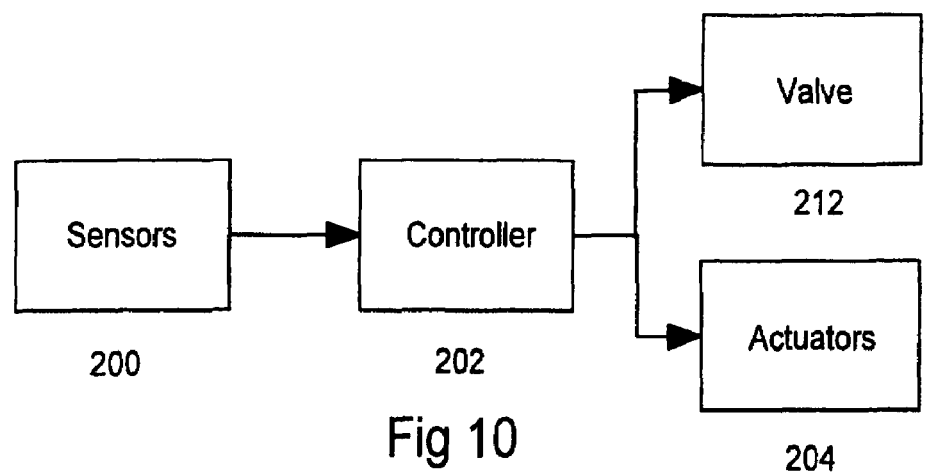
FIG. 10 shows a control block diagram.

A block diagram of a control method is shown in FIG. 10, and includes a controller 202 that receives input from sensors 200, and specifies commands to actuators 204 and a valve 212. The actuators can include a stabilization actuator 208, and an actuator that changes the shape of the robot structure such as actuator 26 in FIG. 7.

An embodiment that allows for control of the orientation of a legged robot 46 is shown in FIG. 7. In this embodiment the stabilizing actuator 208 generates relative motion between the robot structure 20 and the stabilizing mass 206. In the embodiment shown in FIG. 7, the stabilizing actuator is attached to a platform link 38. An alternative embodiments includes attaching a stabilizing actuator 208 to other links 22 in the robot structure. In addition, multiple stabilizing actuators can be attached to the robot structure.

When the stabilizing actuator 208 applies a torque and force between the stabilizing masses 206 and the robot structure 20, an equal an opposite torque and force is applied onto the robot structure 20. In this fashion the stabilizing masses can be used to control the orientation and motion of the robot. The stabilizing masses can be moved in the plane of the paper of the drawing of FIG. 7, and also out of the plane of the drawing to achieve orientation control in three dimension. A stabilizing actuator 208 may be a servomotor, a contractile pneumatic actuator, a pair of contractile pneumatic actuators, or other type of actuator.

Sensors 200 and a controller 202 can be attached to the robot structure 20 as shown in FIG. 7. The sensors 200 can include accelerometers used to determine the orientating of the robot links. In addition, rate gyroscopes could be used to sense the angular velocity of the links and robot. Relative motion sensors can be used to sense the motion between the robot structure 20 and the stabilizing mass 206. These relative motion sensors could be potentiometers, encoders, hall effect sensors, resolvers, or other types of motion sensors.

The controller 202 can be a microprocessor, and an algorithm can be programmed into the microprocessor to define the necessary actuator commands necessary to provide a desired robot hoping performance and direction of travel.

For the purpose of control, it is desired to specify physical quantities such as angular velocity and angular momentum of a robot. The overall robot 46, has multiple components and indeed each link 22 may have a different angular momentum. However, the overall angular momentum of the robot is defined herein as the 3-dimensional vector sum of angular momentums of all the robot components. Furthermore, the angular velocity of the robot is defined herein as the overall angular momentum of the robot divided by the overall moment of inertia of the robot calculated about its instantaneous axis of rotation.

Source and Storage of Pressurized Gas

To activate a pneumatic actuator a source of pressurized gas or liquid is required. A method for providing pressurized gas for pneumatic robot actuators is to include a pressure vessel 210 on the robot such as shown in FIG. 7. In this embodiment, the stabilizing mass 206 includes the pressure vessel. Other robot components can also be included as part of the stabilizing mass 206, such as a battery, sensors, or valves.

In the embodiment shown in FIG. 7 the pressurized gas vessel 210 provides gas to actuator 26. Standard hosing, which is not shown in FIG. 7, connects the pressure vessel to the valve 212, and connects the valve to the actuator 26. In the embodiment shown, the value is a 3-way valve. One such 3-way valve is manufactured by Festo, valve type MHE2, part number 183740. When the solenoid valve is activated, gas travels from the pressure vessel into the actuator 26, thereby activating the actuator. When the solenoid valve is deactivated, then the gas in the actuator is released to the atmosphere.

To provide longer term operation of the actuator a chemical means of creating pressurized gas can be utilized. The chemical mean can include combustion as well as lower temperature reactions. Such chemical reactions can include the type described by Spletzer et al. in U.S. Pat. No. 6,247,546 (2001). The pressurized gas generated from these reaction can be stored in an intermediate pressure vessel, such as the pressure vessel 210 in FIG. 7.

FIGS. 9-10 Embodiment with Horizontal and Vertical Actuators

An alternative embodiment for attaching actuators to the robot structure for the purpose of changing the shape of the robot structure and moving the foot element is shown in FIGS. 9 and 10. In this embodiment two contractile actuators are used to change the shape of the robot structure. In the embodiment shown, there is a vertical actuator 124 and vertical springs 126 attached between the top and bottom pivots 24 of the robot structure 20. In addition, there is a horizontal actuator 120 and horizontal springs 122 attached between the right and left pivots 24 of the robot structure 20.

When the horizontal actuator 120 is actuated, the right and left side of the robot structure come together, resulting in a longer but thinner structure. When the vertical actuator 124 is actuated the top and bottom pivots are brought together, resulting in a shorter but wider structure.

Figures 9A, 9B, 9C:
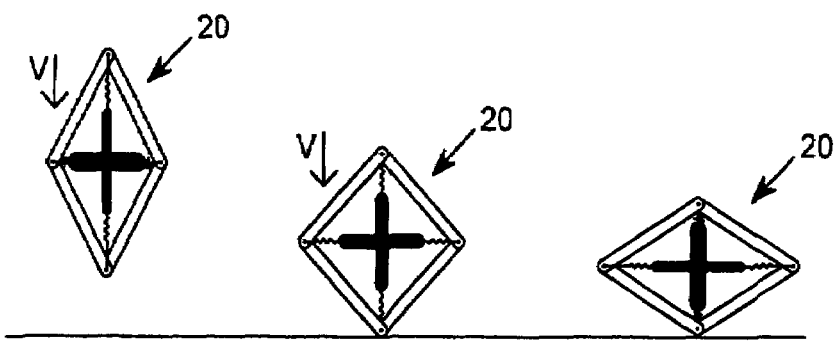
FIG. 9A-9F show stages of robot hopping motion for configuration with horizontal and vertical actuators.
Figures 9D, 9E, 9F:
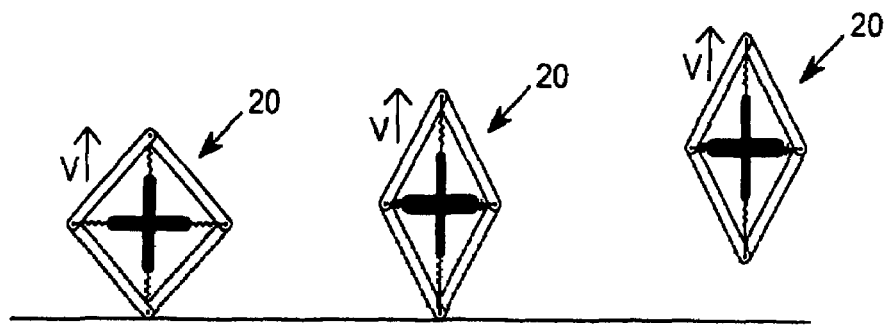

Both vertical and horizontal actuators can be used to increase hopping height. The vertical and horizontal actuators can be activated according to the steps shown in the FIG. 9A-9F. In these figures a velocity vector V designates the direction of motion of the robot structure 20. The steps of motion are:

a) FIG. 9A: The robot structure is in the air falling towards the ground.

b) FIG. 9B: The robot structure contacts ground and continues to move downwards. At approximately this point the vertical actuator 124 is activated while the horizontal actuator 120 is deactivated. This actuator activation increases the downwards velocity of the robot, thereby increasing the kinetic energy of the robot structure.

c) FIG. 9C: The robot structure reaches the bottom of its hoping motion. The increased kinetic energy due to the actuator activation in FIG. 9B, is transferred to the horizontal springs 122.

d) FIG. 9D: The robot structure begins to move upwards. At approximately this point the horizontal actuator 120 is activated while the vertical actuator 124 is deactivated. The result of these actions is that the robot structure lengthens and pushes against the ground.

e) FIG. 9E: The robot structure is moving upwards, but still in contact with the ground.

f) FIG. 9F: The robot structure is in the air moving up away from the ground.

The robot hop height depends in part upon how much energy can be transferred from the actuators, 120 and 124, and springs, 122 and 126, into the robot structure during the brief period during which the robot is in contact with the ground. By using both horizontal and vertical actuators, it becomes possible to apply power from the actuators during the downward motion of the robot as well as during the upward motion. Thus, it becomes possible to increase the energy transfer from the actuators into a hopping motion.

Figure 8:
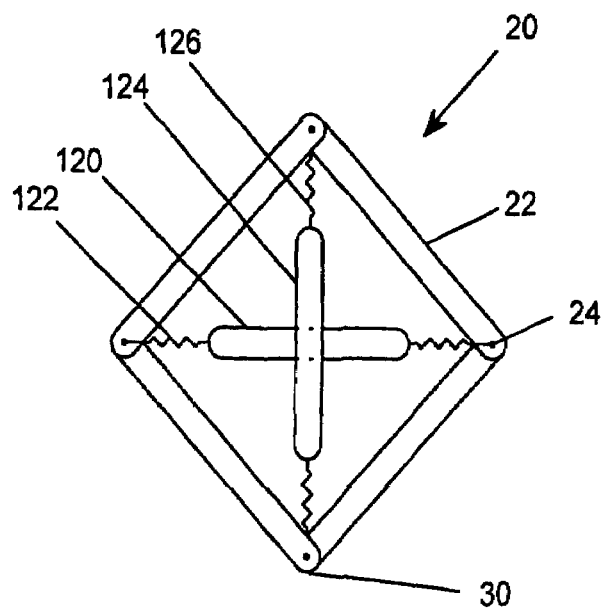
FIG. 8 shows an embodiment of a robot structure with horizontal and vertical actuators.

Two contractile actuators are defined herein to be configured in opposition when their configuration results in one actuator lengthening when the other actuator is contracted. In the embodiment shown in FIG. 8, the robot structure and actuator attachments configures the horizontal actuator 120 and the vertical actuator 124 in opposition. Other embodiments of actuators in opposition include configurations where there are more than two actuators. These embodiments include configurations where contraction of multiple actuators lengthens a single actuator, and where contractions of multiple actuators lengthen multiple other actuators. The orientation of actuators in opposition can be either aligned or not aligned.

A Contractile Pneumatic Actuator behaves partially as a spring in the sense that an external force that stretches a Contractile Pneumatic Actuator puts energy into the actuator. Accordingly, Contractile Pneumatic Actuators that are configured in opposition can transfer energy from one actuator to the other.

Figure 11:
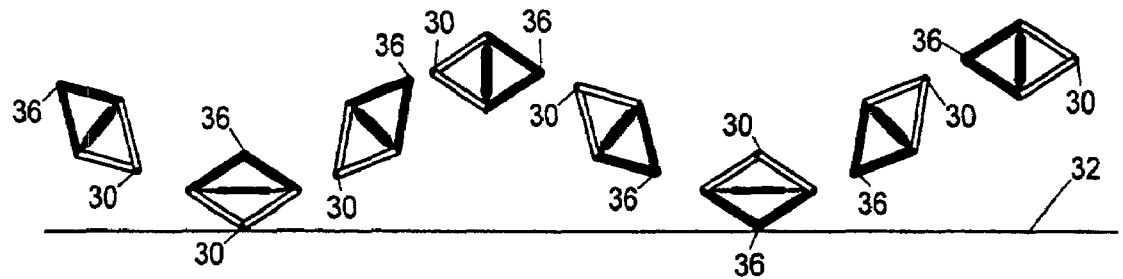
FIG. 11 shows head-over-heels gait.

FIG. 11—Head-Over-Heals Gait

Traditional legged robots have a disadvantage relative to wheeled vehicles. In a wheeled vehicle, the wheels continually rotate in the direction of vehicle motion. Thus, the wheels can maintain a high angular momentum. And thereby allow for high-speed wheeled motion. However, with traditional legged robots each leg has a back and forth gait, which requires a reversal of the angular momentum of the legs and limits the total overall speed of the robot. The head-over-heels control approach shown in FIG. 11 allows for a legged robot to achieve higher speeds associated with wheeled vehicles, while still maintaining the advantage of legged robots in there ability to transverse uneven terrain.

The head-over-heels control approach is similar to a handspring of a gymnast. In the robot embodiment shown in FIG. 11, an opposing foot element 36 has been placed opposite the original foot element 30. The robot controller initiates a rotation in the robot. In this fashion the robot flips over itself, alternately landing on the different foot elements with an orientation that is 180 degrees apart each time it contacts the ground. Thus, the robot has continual forward angular momentum and can move at high speeds.

The head-over-heels gait can be applied to robot structures with just a single foot element or robot structures with more than two foot elements. For example, a foot element 30 could be located near each of the pivots 24 of the robot structure shown in FIG. 1. In this fashion, four foot elements 30 could be on the robot, and the robot could contact the ground 32 at orientations 90 degrees apart.

In a wheeled vehicles there is typically continual contact between the wheel surface and the ground. However, in the head-over-heals gait the contact between the robot and the ground or other surface occurs at discrete foot elements. In the head-over-heels gait the contact between one foot element and the ground can be followed by contact between a second foot element an ground, as shown in FIG. 11.

In a traditional cart with wheels, the direction of rotation of the cart wheels can be defined such that is aligned with the direction of travel of the cart. The 3-dimensional angular velocity vector of a wheel on a traditional cart is perpendicular to the direction of travel of the wheel. In a similar fashion, the Direction of Rotation of a robot is defined herein to be perpendicular to the 3-dimensional angular velocity vector of the robot and parallel to the surface over which the robot is traveling. In the sequence shown in FIG. 11, the Direction of Rotation of the robot in a head-over-heals gait is in the approximate direction of travel of the robot.

FIG. 15—Embodiment of a Flexure Pivot

In the embodiments shown in FIGS. 1, 5,6,7,8 the robot contains rotary pivots 24. A pivot allows rotation between one body and another. A common pivot construction is to use standard rotary bearings, such as rolling element bearings such as ball bearings, or sliding contact bearings such as bushings. An alternate approach is to use flexure pivots 240, such as shown in FIG. 12.

Figure 12:
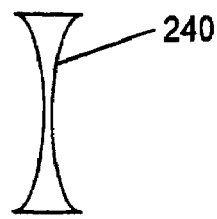
FIG. 12 shows embodiment of a flexure pivot.

A flexure pivot, such as shown in FIG. 12 is configured such that bending in the material of the flexure results in approximately rotary motion between the two ends of the flexure pivot. In the flexure embodiment shown FIG. 12, the center portion of the flexure is much thinner then the end portions, resulting in a rotating pivot about the center of the flexure. The type flexure shown in FIG. 12 is often referred to as an hourglass flexure due to the shape of the flexure. An additional advantage of hourglass shaped flexure pivots is their increased ability to withstand compressive loading.

The use of flexure pivots in the robot embodiments described herein can decrease frictional losses, and thereby increase the efficiency of robot motion. Flexure pivots can be used in all or some of the pivots described herein.

Multi Legged Robots

The embodiments shown in Fig FIGS. 1,2,5-9,11 depict legged robots 46 that move as a single leg. Multi-legged robots can be built by combining the single leg embodiments described herein. For example there could be two legged, four legged, or six legged robots. An advantage of multiple legged robots is that they can stand in a stable configuration without motion thereby conserving energy. Thus a multi-legged robot can achieve higher energy efficiency, which would allow for longer range of motion of the robot. A multi-legged robot could be controlled in a dynamic fashion similar to running, trotting or galloping. Also a multi-legged robot could be controlled in less dynamic mode similar to walking.

CONCLUSIONS, RAMIFICATIONS, AND SCOPE

Accordingly, the reader can see that the dynamic legged robot of this invention can be used to achieve high speed dynamic motion. These advantages include:

Use of contractile actuators in combination with a closed kinematic chain to reduce weight of the robot structure, and thereby reduce energy losses during impact with ground;

Use of lightweight pneumatic contractile actuators to reduce the weight of the robot and the energy source.

Use of opposing contractile actuators to increase power transfer between the robot and the ground during the time when the robot is in contact with the ground.

Use of flexure pivots to reduce energy loss and increase robot motion efficiency.

A high speed head-over-heels gait.

Having described the invention, what is claimed is:

1. A robot comprising:
   a. a robot structure comprising of links connected together with rotary pivots to form a closed kinematic chain;
   b. an actuator that contracts when activated, the actuator comprising
      a bladder, and
      a sheath that constrains motion of the bladder;
   c. a foot element connected to said robot structure; and
   d. connections between said actuator and said robot structure such that when said foot element is placed in contact with a fixed object, and when said actuator is activated, then said foot element pushes against said fixed object.

2. The robot of claim 1, wherein said bladder is inflated with a pressurized gas.

3. The robot of claim 2, where a chemical reaction is the source of said pressurized gas.

4. The robot of claim 1, wherein some of said rotary pivots comprise flexure pivots.

5. The robot of claim 1, further comprising a spring, where said spring is attached in series with said actuator.

6. The robot of claim 5, where said spring is configured such that impact between said foot element and a fixed body transfers mechanical energy into said spring.

7. The robot of claim 1, further comprising a second actuator that contracts when activated; where contraction of said second actuator lengthens said first actuator.

8. The robot of claim 7 wherein contraction of said second actuator transfers energy to said first actuator.

9. The robot of claim 1, further comprising a second foot element connected to said robot structure, where said robot structure is configured such that, when said first foot element is in contact with a flat surface, said second foot element cannot contact said flat surface.

10. The robot of claim 1, further comprising a linkage constraint that constrains motion of said closed kinematic chain such that orientation of one of said links remains approximately equal to orientation of said robot structure, during activation of said actuator.

11. The robot of claim 10, wherein said orientation of said robot structure can be defined by an axis of symmetry of the location of said pivots.

12. The robot of claim 10, wherein said linkage constraint is comprised of gear teeth.

13. The robot of claim 1, further comprising a linkage constraint that constrains motion of said closed kinematic chain such that angular velocity of one of said links remains approximately equal to angular velocity of said robot structure, during activation of said actuator.

14. The robot of claim 1, further comprising a sensor to measure orientation of the robot structure.

15. The robot of claim 14, further comprising a controller to access orientation measurements from the sensor.

16. The robot of claim 15, wherein the sensor comprises an accelerometer to measure impact of the robot structure with the ground.

17. The robot of claim 1, wherein a speed of contraction, power output, and force output of the actuator causes the force between the foot element and ground to be greater than a weight of the robot.

18. The robot of claim 1, further comprising a stabilizing actuator including a stabilizing mass configured to be moved to provide reaction forces and torques to generate desired motion.

19. The robot of claim 18, wherein the stabilizing actuator is a servomotor.

20. The robot of claim 18, wherein the stabilizing actuator generates relative motion between the robot structure and the stabilizing mass.

* * * * *